United States Patent [19]

Atkins, Jr. et al.

[11] Patent Number: 4,568,412

[45] Date of Patent: Feb. 4, 1986

[54] SURFACE CONDUCTIVE POLYIMIDE

[75] Inventors: George M. Atkins, Jr., Wilmington, Del.; Darrell J. Parish, Stoutsville, Ohio

[73] Assignee: E. I. Dupont de Nemours and Company, Wilmington, Del.

[21] Appl. No.: 667,466

[22] Filed: Nov. 1, 1984

[51] Int. Cl.[4] .......................... B44C 1/22; B29C 17/08

[52] U.S. Cl. .................................... 156/655; 156/668; 252/79.5; 428/244

[58] Field of Search ....................... 156/655, 668, 902; 252/79.5; 427/96, 307; 428/244, 473.5, 901

[56] References Cited

U.S. PATENT DOCUMENTS

| | | | |
|---|---|---|---|
| 3,791,848 | 2/1974 | DeAngelo | 156/668 X |
| 4,298,424 | 11/1981 | Terada et al. | 156/668 |

*Primary Examiner*—William A. Powell

[57] ABSTRACT

A process is disclosed for treating the surface of a shaped article of polyimide matrix material and finely-divided conductive carbon dispersed material whereby the electrical surface conductivity is increased by a factor of more than a million-fold.

5 Claims, No Drawings

SURFACE CONDUCTIVE POLYIMIDE

BACKGROUND OF THE INVENTION

1. Field of the Invention

Heat-stable, electrically-conductive, thermoplastic, polymeric materials have long been sought. Sheets of such electrically conductive polymeric materials have been made using polyimide as a heat-stable matrix and finely-divided carbon as a conductive filler. It has often been the case that the interior of carbon-filled polyimide articles exhibits adequate, relatively high, electrical conductivity; but the surface of the articles exhibits very low conductivity. There are uses for electrically conductive polyimide wherein a high volume conductivity is required and uses wherein only a high surface conductivity is required.

2. Description of the Prior Art

Canadian Pat. No. 708,896 discloses that polyimide articles can be made with a carbon particle filler to yield electrical conductivity. British Pat. No. 2,103,633 discloses that polyimide articles having an electrically-conductive filler can be used in combination with metallic circuit configurations in the assembly of compound electrical devices such as printed circuit boards. Neither the Canadian patent nor the British patent contains disclosure relating to increase of electrical conductivity by treatment of the polyimide surface of those articles. Polyimide articles have been etched, using basic compounds, to increase adhesive bond strengths and to create perforations for uses such as in electronic circuitry manufacture.

U.S. Pat. Nos. 3,361,589; 3,871,930; 4,039,371; and 4,426,253 all disclose polyimide etching by a broad range of basic etchant materials. There is no disclosure of etching conductor-filled polyimide articles.

Polyimide articles have also been etched in the direct production of electrically conductive parts. U.S. Pat. Nos. 3,395,057; 3,457,537; 3,546,011; and 3,821,016 all disclose chemical milling of polyimide articles to expose solid, large-area, bodies of metallic electrical conductors.

SUMMARY OF THE INVENTION

In accordance with this invention there is provided a process for increasing the surface conductivity of a shaped article having polyimide as a matrix and carbon dispersed in the matrix comprising the steps of exposing at least one surface of the article to an etchant solution of an aqueous or alcoholic solution of a basic material such as an alkali metal hydroxide for a time sufficient to remove a surface layer of the polyimide; rinsing the exposed surface with an aqueous or alcoholic liquid to remove the etchant; and drying the rinsed surface.

DETAILED DESCRIPTION OF THE INVENTION

The polyimide matrix materials to be used in the process of this invention includes any polyimide chemically converted from a polyamide acid having the general structural formula

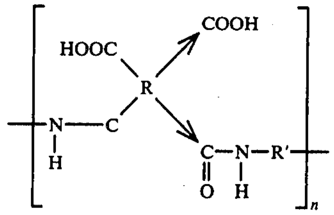

wherein the arrows denote isomerism, R is an organic tetravalent radical containing at least two carbon atoms, no more than two carbonyl groups of each polyamide acid unit being attached to any one carbon atom of said tetravalent radical; R′ is a divalent radical containing at least two carbon atoms, the amide groups of adjacent polyamide acid units each attached to separate carbon atoms of said divalent radical; and n is a positive integer sufficient to provide the polyamide acid with an inherent viscosity of at least 0.1. Typical of such polyimide is that which is formed from a reaction of pyromellitic dianhydride and 4,4′-diamino-diphenylether having an average molecular weight ranging from about 60,000 to about 250,000. Such polyimides and their preparation are described in U.S. Pat. No. 3,179,614.

Carbon which can be used in practice of this invention is finely-divided and particulate and is usually one of the "blacks" such as furnace black, acetylene black, bone black, and the like. Other forms of carbon, such as graphite, can also, of course, be used provided that the carbon is relatively pure, and electrically conductive.

The carbon particles should have an average aggregate size of about 0.5 micrometers with a size range of about 0.1 to 5.0 micrometers, and preferably about 0.3 to 0.5 micrometers. Although carbon particles of widely varying sizes can be used, it has been found that particles below about 0.1 micrometers in ultimate diameter form agglomerates which make effective dispersion in a polymer matrix very difficult. Carbon particles above about 0.7 micrometers in ultimate diameter generally result in systems of poor electrical conductivity.

The carbon should be present in the polyimide matrix in a concentration of from about 10 to 75 weight percent and, preferably, from about 15 to 45 weight percent of the blend of carbon and polyimide. While any amount of carbon will operate to increase the electrical conductivity of the polyimide matrix, it has been found that less than about 10 weight percent carbon will not, generally, provide the desired degree of increase. Moreover, the use of greater than about 90 weight percent, and with some polyimides greater than about 75 weight percent, carbon will structurally weaken articles made from the polyimide.

Polyamide acid precursor to the polyimide of this invention is made by polymerization, in solution, as stated, of a diamine with a dianhydride. The polymerization is controlled by reaction conditions and by the relative molar amounts of components provided for reaction. The polymerization is, generally, conducted at a temperature below about 50°-100° C. in order to maintain a high proportion of polyamide acid; and nearly equimolar amounts of diamine and dianhydride are used to obtain the highest inherent viscosity. The inherent viscosity of the polyamide acid used in this invention must be at least 0.1 and is preferably 1.4 to 2.5. Inherent viscosity, a polymer characteristic directly related to molecular weight, is determined at 30° C. at a concentration of 0.5 weight percent of the polyamide acid in a suitable solvent such as N,N-dimethylacetamide. To calculate inherent viscosity, the viscosity of the polyamide acid solution is measured and compared with the viscosity of the solvent alone.

$$\text{Inherent viscosity} = \frac{\text{natural log} \frac{\text{visc. of solution}}{\text{visc. of solvent}}}{C}$$

where C is the concentration of polyamide acid expressed as grams of polymer per 100 milliliters of solution.

In preparation of the polyamide acid, the amount of solvent need only be that required to dissolve enough of one of the reactants, preferably the diamine, to initiate the reaction of the diamine and the dianhydride. For forming the resulting composition into shaped articles, it has been found preferable to have at least 60 weight percent solvent in the composition. That is, the solution used for forming shaped articles should contain about 0.5 to 40 weight percent of the polyamide acid. The preferable solvent will, also, be nonreactive with reactants or products of the reaction and will dissolve the polyamide acid reaction product and at least one of the reactant components. N,N-dimethylacetamide, N,N'-dimethylformamide, N,N-dimethylsulfoxide, and N-methylpyrrolidone are most usually used in reactions of pyromellitic dianhydride and 4,4'-diamino-diphenylether.

The carbon can be added at any stage in the preparation of the polyamide acid. The carbon particles can be added to the solvent prior even to the introduction of the diamine and the dianhydride. The carbon can also be added to a solution of one or both of the reactants before, during, or after the formation of the polyamide acid. The carbon is, preferably, added to a solution of the polyamide acid. Any method of agitation can be used for dispersing the carbon particles so long as the dispersion is thorough and substantially homogeneous throughout the resulting matrix.

The polyamide acid solution with carbon particles, once made, can be formed into shaped articles by extruding the solution through an appropriate orifice or slot to form filaments, rods, flat sheets, or tubing, and the like. Alternatively, the composition can be cast onto flat or curved surfaces to form sheets or films and the like, or placed in molds of the desirable shape. The composition can, also, be applied to other articles as a coating.

In practice of the present invention, formed polyamide acid articles are converted to polyimide shaped articles by chemical conversion. Chemical conversion of the polyamide acid is accomplished by treating the polyamide acid with a chemical dehydrating agent alone or in combination with a tertiary amine. The dehydrating agent is necessary for the chemical conversion but the tertiary amine can be used or not, as desired or required for a particular case. It is believed that the tertiary amine functions as a catalyst for the dehydrating imidizing agent. Acetic anhydride is an often-used dehydrating agent and beta-picoline is one generally effective tertiary amine. The polyamide acid shaped article can be treated in a bath containing the dehydrating agent or it can otherwise be exposed to the dehydrating agent to accomplish imidization.

As already stated, a primary object of the present invention resides in decrease of the electrical resistivity of the surface of certain polyimide articles which articles exhibit initially high surface resistivity. It has been found that the process of this invention can be used to decrease the surface resistivity of chemically converted polyimide to a remarkable degree—often by as much as nine orders of magnitude—but that use of this process or on thermally converted polyimide often does not result in any appreciable decrease in resistivity. The fact of these differences is expressed in the examples which follow but the reasons for the differences are not entirely understood. The process of the present invention is useful to decrease the surface resistivity of carbon-filled polyimide articles having initially high surface resistivity and it is usually the case that chemically converted polyimide is the polyimide with highest initial surface-resistivity. Heat or thermal conversion of polyamide acid is accomplished by merely heating the polyamide acid above about 50° C. Heating converts pairs of amide and carboxylic acid groups to imide groups; and the heating may be required for from only a few seconds to several hours depending upon the polyamide acid starting materials. The thermal conversion is usually conducted at temperatures of from 60° to 400° C.

Any combination of the above-described thermal and chemical conversions can be used such as by a short heat treatment for partial conversion followed by a chemical completion or an incomplete exposure to chemical conversion followed by strong heat treatment. The process of the present invention will be useful to decrease the surface resistivity of the product of such combined conversions.

It has been found that the matrix of the shaped articles, once converted from polyamide acid to polyimide, can be improved, in thermal and hydrolytic stabilities, by a further heat treatment at about 300°-500° C. for a short time—about 15 seconds to 2 minutes.

Shaped, carbon-filled, polyimide articles made in accordance with the preceding description exhibit an electrical surface resistivity which decreases with increase in carbon content. As an example, sheets of polyimide 25 micrometers thick made from pyromellitic dianhydride and 4,4'-diamino-diphenylether, having 18 weight percent furnace black, and thermally converted by heat treatment for 30 minutes at 300° C. exhibit a surface resistivity of 500 ohms/square. The same material but imidized by chemical conversion rather than by heat exhibits a surface resistivity of $10^{15}$ ohms/square.

The process of the present invention dramatically decreases the surface resistivity of shaped articles such as those discussed above; and the decrease in surface resistivity of shaped articles having a matrix of polyimide made by chemical conversion is especially surprising.

Shaped articles having polyimide as a matrix and carbon dispersed in the matrix are treated, in accordance with this invention, by controlled exposure to an etchant solution followed by removal of the etchant and drying of the surface of the shaped article.

The etchant solution has water or lower alcohols or a combination of those as the solvent. If water, alone, is used, care must be exercised to insure complete wetting of the polyimide matrix surface. By lower alcohols is meant any alcohol which is completely miscible with water. The most notable lower alcohols are methanol, ethanol, and propanol and, of those, ethanol is preferred. When a combination of water and alcohol is used, from 50 to 90 weight percent alcohol is preferred and 80 weight percent ethanol is most preferred.

Alkali metal hydroxides are used as preferred basic solutes for the etchant solutions. Sodium hydroxide is preferred with water solvent etchant solution and potassium hydroxide is preferred when the solution includes alcohol. While a wide range of hydroxide concentrations are useful, 1–2 normal is the range of concentrations usually used and preferred for exposure of a few minutes at about 20° C. The aforementioned U.S. Pat. No. 3,361,589 contains disclosure of additional basic solutes eligible for use in this invention.

The time for exposure to the etchant solution cannot be definitely specified because the time required varies as a function of solution temperature, solute kind and concentration, kind of polyimide, and other factors. In the examples which follow, however, representative times for exposure are disclosed and an adequate teaching is made thereby.

When exposure has been conducted for a time sufficient to remove an adequate surface layer of the polyimide, the etchant solution is rinsed away from the exposed surface by lower alcohol or water or a combination of those. If desired, the basic solute can be neutralized by an appropriate acid during or before the rinsing step. The rinsing is generally accomplished by immersion in flowing rinse liquid or by drawing the shaped article through a bath of rinse liquid. Of course, the shaped article can be sprayed with rinse liquid, if desired. While the temperature of the rinse liquid does not seem to be critical, it is generally used at a temperature within 10° C. of the temperature of the etchant solution. While a combination of lower alcohol and water is preferred for the rinse liquid, the proportions of alcohol and water are not important; and ethanol is the preferred alcohol component for the rinse liquid.

Drying the rinsed shaped articles can be most effectively accomplished by exposure to warm or hot air. If the shaped article is in the form of a film or web, it can be festooned in a drier or otherwise passed through a drying tower. Other shaped articles can be treated in accord with their particular shape.

DESCRIPTION OF THE PREFERRED EMBODIMENTS

EXAMPLE 1

A carbon-filled polyimide film 50 micrometers thick was made as follows.

3,3',4,4'-pyromellitic dianhydride was reacted with 4,4'-diamino-diphenylether, mole-for-mole, in N,N-dimethylacetamide (DMAC) to yield a solution of 15 weight percent polyamide acid. The polyamide acid was found to have an inherent viscosity of 1.8 deciliters per gram in DMAC at 30° C.

A slurry of 7 weight percent carbon in DMAC was ground in a ball mill until the carbon had a nominal aggregate size of 0.3 micrometers. The carbon was furnace black having an ultimate particle size of 0.18 micrometers as sold by Cabot Corporation under the trade designation "Monarch 700".

The slurry and acetic anhydride and beta-picoline conversion chemicals were combined with the solution of polyamide acid, and chilled to slow polyimidization. The slurry was added such that the solids in the resulting system were 25 weight percent carbon; and the conversion chemicals were added such that the resulting system had 4 moles of acetic anhydride and 2.2 moles of beta-picoline for each repeating segment (mole) of polyamide acid.

The resulting system was continuously cast into a polyamide acid film about 300 micrometers thick which gelled to 4 mils thick when warmed for partial polyimide conversion and which became a polyimide film upon heating under dimensional restraints at about 400° C. for about 5 minutes. The polyimide of this example is partially chemically converted and partially thermally converted from the initial polyamide acid.

A 1-normal hydroxide treatment solution was made from 13 weight parts water, 76 weight parts ethanol, and 11 weight parts of a 10 normal aqueous solution of potassium hydroxide; and portions of the carbon-filled film made above were immersed in the solution for various times at about 18° C. The film samples were then thoroughly rinsed with water and dried in air. Surface and volume resistivities were determined for the untreated film as a control and for the treated film samples as exemplary of the present invention. The voltage for resistivity determinations was 60 volts.

| Treatment | Resistivities | |
|---|---|---|
| Time | Surface (ohm/sq) | Volume (ohm-cm) |
| 0 (Control) | $3.0 \times 10^{17}$ | $3.0 \times 10^{16}$ |
| 2 minutes | $2.0 \times 10^{10}$ | $2.0 \times 10^{16}$ |
| 4 minutes | $4.0 \times 10^{10}$ | $2.0 \times 10^{15}$ |
| 8 minutes | $3.0 \times 10^{9}$ | $3.0 \times 10^{13}$ |
| 30 minutes | $4.0 \times 10^{8}$ | $1.0 \times 10^{13}$ |

EXAMPLE 2

A carbon-filled film 150 micrometers thick was made using the same materials in the same manner and the same amounts as were used in Example 1 except that the carbon black was used in an amount to yield 22 weight percent carbon in the film. The same treatment solution as in Example 1 was used at varying times for portions of the film and the resistivity results were as follow:

| Treatment Time | Surface Resistivity (ohm/sq) |
|---|---|
| 0 (Control) | $3.6 \times 10^{13}$ |
| 1 minutes | $2.0 \times 10^{11}$ |
| 2.5 minutes | $1.0 \times 10^{13}$ |
| 5 minutes | $3.7 \times 10^{12}$ |
| 10 minutes | $4.0 \times 10^{11}$ |
| 15 minutes | $2.0 \times 10^{7}$ |

EXAMPLE 3

Additional film was made as nearly like the film of Example 1 as possible. It was treated using the solution and process described in Example 1 and the surface resistivity was determined for both sides of the treated samples. Results are as follow:

| Treatment | Surface Resistivity (ohm/sq) | |
|---|---|---|
| Time | Top Side | Bottom Side |
| 0 (Control) | $1.7 \times 10^{17}$ | $2.3 \times 10^{17}$ |
| 35 seconds | $1.7 \times 10^{11}$ | $2.0 \times 10^{12}$ |
| 40 seconds | $4.3 \times 10^{12}$ | $9.1 \times 10^{12}$ |
| 50 seconds | $1.6 \times 10^{12}$ | $1.1 \times 10^{12}$ |
| 50 seconds | $6.2 \times 10^{10}$ | $5.3 \times 10^{11}$ |
| 70 seconds | $1.6 \times 10^{12}$ | $5.0 \times 10^{12}$ |
| 120 seconds | $1.0 \times 10^{10}$ | $5.6 \times 10^{10}$ |

EXAMPLE 4

To provide a controlled comparison between polyimide made using chemical conversion and polyimide completely converted by thermal means, a master batch of polyamide acid was made as follows for laboratory film casting:

3,3',4,4'-pyromellitic dianhydride and 4,4'-diaminodiphenylether were dissolved, mole-for-mole in N,N-dimethylacetamide (DMAC) to yield a solution which, after agitation for about 45 minutes at about 45° C., was about 15 weight percent polyamide acid having an inherent viscosity of about 1.8 deciliters per gram in DMAC at 30° C.

Carbon in the form of furnace black having an ultimate particle size of 0.3 micrometers (as sold by Cabot Corporation under the trade designation "Vulcan XC72") was blended into the polyamide acid solution by being added to DMAC in the weight ratio of 7 parts carbon to 93 parts DMAC and ball milled for 96 hours, in an amount to result in a system in which the non-volatile material was 18 weight percent carbon.

For preparation of thermal conversion samples, the polyamide acid solution was poured onto a glass plate and drawn to a wet thickness of about 50 micrometers using a casting bar. The drawn solution was gelled by heating at about 100° C. for about 20 minutes; and was then heated to about 300° C. for about 30 minutes to yield thermally converted film about 4 micrometers thick.

For preparation of samples using chemical conversion, acetic anhydride and beta-picoline conversion chemicals were combined with DMAC to yield a 10%, by weight, solution which was stirred into the carbon-containing polyamide acid mixture that mixture was, thereafter, immediately cast into film to avoid premature imidization. The ratios of acetic anhydride to beta-picoline as well as the amounts were varied and are given in the table following this example as a function of moles of the conversion chemical per mole (repeating segment) of the polyamide acid.

The polyamide acid solutions with conversion chemicals were poured onto glass plates and drawn to wet thicknesses of about 50 micrometers; and those wet films were gelled by heating at about 100° C. for about 6 minutes and finally were cured under restraint by exposure to a temperature of 300° C. for 30 minutes.

The film samples were treated by being immersed in 2-normal ethanolic potassium hydroxide solution for varying periods of time; rinsed with distilled water; and dried for 5 minutes at 100° C.

Surface resistivities for the several samples are given in the following table:

| Film Sample | beta-Picoline (m/m Polyamide) | Acetic Anhydride (m/m Polyamide) | Treatment Time (minutes) | Surface Resistivity (ohms/square) |
|---|---|---|---|---|
| (A) thermal | 0 | 0 | 0 | 687 |
| | 0 | 0 | 1 | 704 |
| | 0 | 0 | 2 | 652 |
| | 0 | 0 | 10 | 790 |
| (B) chemical | 2.2 | 1.0 | 0 | $5.05 \times 10^4$ |
| | 2.2 | 1.0 | 1 | $4.63 \times 10^4$ |
| | 2.2 | 1.0 | 2 | $2.97 \times 10^4$ |
| | 2.2 | 1.0 | 10 | $0.80 \times 10^4$ |
| (C) chemical | 2.2 | 1.5 | 0 | $>10^8$ |
| | 2.2 | 1.5 | 1 | $3.57 \times 10^5$ |
| | 2.2 | 1.5 | 2 | $1.50 \times 10^5$ |
| | 2.2 | 1.5 | 10 | $0.51 \times 10^5$ |
| (D) chemical | 2.2 | 2.0 | 0 | $>10^8$ |
| | 2.2 | 2.0 | 1 | $5.25 \times 10^5$ |
| | 2.2 | 2.0 | 2 | $3.45 \times 10^5$ |
| | 2.2 | 2.0 | 10 | $4.90 \times 10^5$ |
| (E) chemical | 2.2 | 4.0 | 0 | $>10^8$ |
| | 2.2 | 4.0 | 1 | $>10^8$ |
| | 2.2 | 4.0 | 2 | $1.84 \times 10^5$ |
| | 2.2 | 4.0 | 10 | $1.52 \times 10^5$ |

We claim:

1. A process for increasing the surface conductivity of a shaped article having polyimide as a matrix and carbon dispersed in the matrix comprising the steps of:

(a) exposing at least one surface of the article to an etchant solution of an aqueous or alcoholic solution of a basic material for a time sufficient to remove a surface layer of the polyimide;

(b) rinsing the exposed surface with an aqueous or alcoholic liquid to remove the etchant; and (c) drying the rinsed surface.

2. The process of claim 1 wherein the solution of step (a) has, as a solvent, water and a lower alcohol and, as a solute, potassium hydroxide.

3. The process of claim 2 wherein the solution of step (a) is from about 1 to 2 normal potassium hydroxide in an aqueous solvent of 50 to 90 weight percent ethanol.

4. The process of claim 1 wherein the liquid of step (b) is water.

5. A process for increasing the surface conductivity of a film having polyimide as a matrix and from 10 to 90 weight percent finely-divided carbon substantially homogeneously dispersed throughout the matrix including immersing the film in an etchant solution of about 1 to 2 normal basic material in an aqueous solvent of 50 to 90 weight percent lower alcohol, rinsing the film with an aqueous liquid to remove the etchant, and drying the rinsed film.

* * * * *